US006613837B2

(12) United States Patent
Reddy et al.

(10) Patent No.: US 6,613,837 B2
(45) Date of Patent: *Sep. 2, 2003

(54) MONOVINYLAROMATIC POLYMER WITH IMPROVED STRESS CRACK RESISTANCE

(75) Inventors: B. Raghava Reddy, Baytown, TX (US); Kenneth P. Blackmon, Houston, TX (US)

(73) Assignee: Fina Technology, Inc., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/379,813

(22) Filed: Aug. 23, 1999

(65) Prior Publication Data

US 2003/0105241 A1 Jun. 5, 2003

Related U.S. Application Data

(63) Continuation of application No. 08/828,206, filed on Mar. 21, 1997, which is a continuation of application No. 08/547,824, filed on Oct. 25, 1995, now abandoned.

(51) Int. Cl.$^7$ ............................................. C08L 51/04
(52) U.S. Cl. .................... 524/848; 524/849; 525/70; 525/86; 525/244; 525/316
(58) Field of Search .................. 525/244, 215, 525/316, 70, 86; 524/848, 849

(56) References Cited

U.S. PATENT DOCUMENTS

| 3,506,740 A | * | 4/1970 | Dempsey et al. | |
| 5,543,461 A | | 8/1996 | Nke-Aka et al. | 525/74 |
| 5,861,455 A | | 1/1999 | Reddy et al. | 524/504 |

OTHER PUBLICATIONS

D. Heinrich "Acryloniyrile–Butadiene–Styrene Modfifcation Using Amoco Polybutene" (1995).*
"Amoco Polybutene" Amoco Company Bulletin 12–N (1994).*
"Rubber–Toughened Styrene Polymers," by Adolf Echte published by the American Chemical Society, copyright 1989, pp. 16–63.

* cited by examiner

Primary Examiner—Jeffrey Mullis
(74) Attorney, Agent, or Firm—Bradley A. Misley

(57) ABSTRACT

The present invention discloses a composition of matter consisting of a high impact polystyrene exhibiting improved environmental stress crack resistance. The HIPS material is formed utilizing polybutadiene, polyisoprene, and copolymers thereof with styrene, having a Mooney viscosity exceeding about 35 and a gel content of up to about 28%. The present invention discloses the use of a combination of lubricant additives to obtain a HIPS material with higher ESCR values than either additive alone could provide, and also discloses the optimum level of each additive.

38 Claims, No Drawings

MONOVINYLAROMATIC POLYMER WITH IMPROVED STRESS CRACK RESISTANCE

CROSS REFERENCED TO RELATED APPLICATION

This application is a continuation of a copending continuation application Ser. No. 08/828,206, filed Mar. 21, 1997, which is a continuation of a copending application, Ser. No. 08/547,824, filed Oct. 25, 1995, now abandoned by B. Raghava Reddy, et al., under the same title.

FIELD OF THE INVENTION

The present invention relates to thermoplastic compositions utilizing polymers of monovinylaromatic compounds which have been modified with rubber to increase their impact strength and which are particularly useful for manufacturing articles requiring increased environmental stress crack resistance (ESCR). More particularly, the present invention discloses a high impact polystyrene (HIPS) material which is particularly advantageous for use in food product containers which are normally subject to environmental stress cracking.

BACKGROUND OF THE INVENTION

It is well known that rubber-reinforced polymers of monovinylaromatic compounds, such as styrene, alphamethyl styrene and ring substituted styrenes are desirable for a variety of uses. More particularly, rubber reinforced polymers of styrene having included therein discrete particles of a crosslinked rubber, for example, polybutadiene, the discrete particles of rubber being dispersed throughout the styrene polymer matrix, can be used in a variety of applications including refrigerator linings, packaging applications, furniture, household appliances and toys. The conventional term for such rubber reinforced polymers is "High Impact Polystyrene" or "HIPS". The physical characteristics and mechanical properties of HIPS are dependent upon many factors, including the particle size of the crosslinked rubber particles. One of the most desirable characteristics of HIPS material is the ability of such material to resist environmental stress cracking. This ability must be coupled with a high impact strength in order to be useful in articles such as food containers. In addition, other such properties which must be maintained for such articles include flexural strength and tensile strength.

The property of stress crack resistance, or environmental stress crack resistance (ESCR), is particularly important in thermoplastic polymers utilized in food containers. The food content of such polymer containers might not normally degrade the type of polymeric material of which the container is made, but when a thermoplastic polymer is thermoformed from extruded sheet material, residual stresses are locked into the molded article. These stresses open the polymer up to attack by substances which it would normally be totally resistant to. Such articles made from styrene polymers modified with rubber to increase impact strength are prone to stress cracking when they come into contact with common agents found in organic food products such as fats and oils. Likewise, such products are also subject to stress cracking when coming into contact with organic blowing agents such as halohydrocarbons, containing fluorine and chlorine. These polymers generally are found in household items such as refrigerator liners, which may crack when the cavities in the refrigerators are filled with a polyurethane foam as a result of the blowing agent utilized in the foam.

In the past, environmental stress cracking has been prevented by complex procedures usually involving multiple layer polymer construction wherein an intermediate protective layer of polymer is placed between the polystyrene layer and the blowing agent or the fatty food materials. One such layer of material utilized to insulate the styrene from these agents is the terpolymer material known as ABS, or acrylonitrile-butadiene-styrene. Other attempts to improve the stress crack resistance of high impact monovinylaromatic polymers have been to increase the amount of rubber mixed in the polymer. Unfortunately the higher rubber content decreases the tensile and flexural strengths. Other solutions have involved the use of tightly controlling process conditions to maintain strict control over particle size of the rubber particles cross linked within the polystyrene matrix. One such patent disclosing this technique is that granted to the assignee of the present invention, U.S. Pat. No. 4,777,210, issued Oct. 11, 1988, in which a continuous flow process for producing high impact polystyrene and for providing reliable and reproducible methods for varying particle sizes was disclosed. In that patented process, a pre-inversion reactor was utilized to convert a solution of styrene, polystyrene, rubber (such as polybutadiene) and a peroxide catalyst into a high impact polystyrene material exhibiting high environmental stress crack resistance.

Another attempt to improve stress crack resistance was that disclosed in U.S. Pat. No. 4,144,204 to Mittnacht, et al., dated Mar. 13, 1979 in which a monovinylaromatic compound was modified with rubber to increase the ESCR and wherein the amount of rubber dissolved in the monomer prior to polymerization was chosen so that the content of the soft component (gel phase) in the impact resistance polymer was at least 28% by weight and preferably 38% by weight or more, based on the weight of the impact resistant polymer. The upper limit of the content of soft component was about 50 to 60% by weight and a preferable range of 30 to 40% by weight was found advantageous.

A third method used conventionally to increase ESCR in HIPS is that disclosed in British patent specification 1,362,399 in which a liquid hydrocarbon telomer having an unsaturated carbon chain is added to the HIPS material in amounts ranging from 0.2 up to 5 parts per hundred. Telomers are defined in Websters unabridged dictionary as the products of chemical reaction involving the addition of fragments of one molecule (such as alcohol, acetal or chloroform) to the ends of a polymerizing olefin chain. In the British patent, the specific telomers used were butadiene telomers terminated by benzyl groups from benzyl chloride, having number average molecular weights in the range of 1000 to 6000. Experiments attempting to utilize low molecular weight polybutadienes to manufacture ESCR-HIPS have been unsuccessful because of cross-linking, indicating that this patented process utilizes butadienes which are compounded or blended with polystyrene rather than being added during the polymerization reaction.

Another attempt to improve the stress crack resistance of HIPS material can be found in British patent No. GB 2,153,370A, wherein a HIPS material was manufactured utilizing a high molecular weight rubber material having a stated molecular mass of at least 300,000, a viscosity greater than or equal to 140 centipoise; the resulting HIPS containing between 7 and 10% by weight of rubber, and the polymerization being carried out in the presence of alpha-methyl styrene dimer or a compound chosen from n-dodecylmercaptan, tertiarydodecylmercaptan, diphenyl 1,3 butadiene, or various other compounds or mixtures thereof. Also, this process was carried out in the presence of cyclohexane and ethylbenzene equal to at least 7% by weight of the total ingredients. In addition, additives including monotriglycerides of stearates from polyethylene waxes were also necessary.

On the other hand, additives are used for reasons besides ESCR improvement. U.S. Pat. No. 3,506,740 to Dempsey, et al. teaches the use of low molecular weight polyolefins as internal lubricants for impact polystyrene compositions. Listed examples include polypropylenes and polybutylenes with molecular weights in the range of 800 to 1600 (as measured by vapor pressure osmometry).

SUMMARY OF THE INVENTION

The present invention overcomes the disadvantage of the known high impact polystyrene materials by providing a polystyrene material containing a polybutadiene or styrene-butadiene rubber and also containing a synergistic combination of lubricant additives. The high impact polystyrene disclosed by the present invention demonstrates a high resistance to environmental stress cracking, high impact strength, good tensile strength and good flexural strength.

DESCRIPTION OF THE PREFERRED EMBODIMENTS

The present invention discloses a thermoplastic composition containing a polymer of a monovinylaromatic compound which has been modified with a rubber to increase its impact strength and environmental stress crack resistance, which compound is obtained by polymerizing the monovinylaromatic material in the presence of the rubber. In the composition, the portion of the soft component in the polymer, which has been modified to increase the impact strength, is less than 28% by weight based on the polymer, the soft component being defined as the toluene-insoluble constituent of the polymer which has been modified to increase its impact strength, minus any pigment which may be present. The particular rubber utilized in the present invention could be one of several types, for example the type sold by Firestone and designated as Diene 55 having a Mooney viscosity of approximately 55, a number molecular weight of about 150,000, weight average molecular weight of about 300,000, and a Z molecular weight of about 500,000 as measured by the gel permeation technique. Another type of advantageous rubber material includes the high-Cis rubbers.

The high impact polymers may be manufactured in accordance with any conventional process, provided the constituents mentioned hereinabove are utilized. Normal manufacturing processes include mass polymerization and solution polymerization such as that disclosed in U.S. Pat. No. 2,694,692 or mass suspension polymerization such as that disclosed in U.S. Pat. No. 2,862,906. Other processes of manufacture may also be used, provided the processes are capable of utilizing the constituents mentioned hereinabove.

Suitable monovinylaromatic compounds utilizing the present invention include styrene as well as styrenes alkylated in the nucleus or side-chain such as alphamethylstyrene and vinyltoluene. The monovinylaromatic compounds may be employed singly or as mixtures. In one preferred embodiment, styrene was the monovinylaromatic compound of preference. The high impact polystyrene manufactured according to the present invention is formed by polymerizing the monovinylaromatic compound in the presence of the rubber. The level of rubber utilized is preferably in the range of about 5–15% by weight of the solution. The polymerization is carried out in a conventional manner by mass polymerization, solution polymerization, or polymerization in aqueous dispersion, the rubber first being dissolved in the polymerizable monomer and this solution then being subjected to polymerization. Suitable polymerization initiators, e.g., peroxides or azo-type compounds, may be used to obtain desirable polymerization rates. When using solution polymerization, the starting solution may be mixed with up to about ten percent (10%) by weight based on the monovinylaromatic compound employed of an inert diluent. Preferred inert diluents include aromatic hydrocarbons or mixtures of aromatic hydrocarbons such as toluene, ethylbenzene, xylenes, or mixtures of these compounds. Suitable chain transfer agents, e.g., mercaptans or alphamethyl styrene dimer, may also be added to control polymer molecular weight and rubber particle size.

The present invention may also be utilized in a continuous flow process for producing polystyrene utilizing a pre-inversion reactor in which a solution of styrene and rubber are polymerized to a point below the inversion and then introduced into a second stirred tank reactor. The viscosity of the solutions in the pre-inversion and in the second stirred tank reactor are closely controlled to produce desirable HIPS. The particular process for manufacturing the preferred embodiment may be found in U.S. Pat. No. 4,777,210 to Sosa, et al., dated Oct. 11, 1988, the entire disclosure of which is hereby incorporated herein by reference.

The ESCR-enhancing additives may be added to the initial monomer/rubber feed stream or at any point in the polymerization process up to and including the final polymerization reactor. The synergistic additive combination which was found to provide unexpected increases in ESCR properties comprised polyisobutylene (PIB) and more specifically, PIB with viscosity in the range of 196–233 cst at 99° C., and mineral oil. These additives are utilized in varying proportions with a preferable ratio of approximately equal proportions in amounts of about 0.5 up to about 3.0% by weight, with a preferable final ratio of about 2.0% mineral oil and 2.0% PIB (by weight) in the final product.

In a first embodiment of the invention, a mixture of conventional rubber having a molecular weight corresponding to a Mooney viscosity of approximately 55 and styrene monomer was polymerized into a high impact polystyrene material by the above-mentioned patented process. During the later stages of polymerization of this HIPS material, a combination of lubricant additives comprising 1.25% of mineral oil and 1.25% PIB by weight was added in one intermediate stage reactor. The PIB exhibited a viscosity of about 196–233 cst at 99° C., and the mineral oil exhibited a viscosity of about 78.7 cst at 38° C. The mineral oil selected was a commercially available product sold by Pennzoil Products Company (Penreco Div.), and identified as "Penreco Supreme Mineral Oil". The particular PIB utilized was a commercially available product sold by Amoco Corporation and designated as H100, having a measured viscosity range of 196–233 cst at 99° C. and $M_n$ of 965 as determined by gel permeation chromatography ("gpc"). The finished product was then tested for environmental stress crack resistance and tensile strength, with the results set out below in Table I as Sample "F", which compared HIPS materials with varying levels of mineral oil or PIB lubricants.

It can be seen from Table I that the conventional mineral-oil-modified high impact polystyrene and PIB-modified high impact polystyrene both exhibit a much lower ESCR than the material manufactured with the blend of equal proportions of mineral oil and PIB lubricants.

For example, Sample "A" represents a conventional HIPS material, or Control, of straight HIPS material with no lubricant. The ESCR value is 41.1 for this material. Sample "B" is a HIPS material manufactured with only 1.5% mineral oil as a lubricant. The resulting ESCR value for this sample was significantly higher at 52.2. By increasing the mineral oil content to 2.5% by weight as in Sample "C", the ESCR value of the HIPS material was increased to 61.7.

Samples "D" and "E" utilized a PIB lubricant in place of the mineral oil of the earlier samples. The first contained PIB at a level of 1.5% by weight, obtaining an ESCR value of 85. The second PIB sample utilized a 2.5% level of PIB and improved the ESCR to 90.6.

Sample "F" however, contained moderate but relatively equal amounts of PIB and mineral oil and exhibited by far the best ESCR value of all: 96.3. The last example, "G", was a HIPS material using a blend of PIB and mineral oil additives in which the mineral oil was doubled and the PIB held constant from Example "F". The resulting ESCR was much lower at 83. Thus it can be seen that relatively equal and moderate amounts of both mineral oil and PIB additives provide an unexpected increase in the ESCR value of HIPS material.

TABLE I

Characterization of HIPS Samples Produced for ESCR Study.

| Property | A Control | B 1.5% MO | C 2.5% MO | D 1.5% E100 | E 1.25% H100 | F 1.25% MO + 1.25% H100 | G 2.5% MO + 1.25% H100 |
|---|---|---|---|---|---|---|---|
| Tg | 108.0 | 100.2 | 100.9 | 104.8 | 105.0 | 99.58 | 94.11 |
| % Rubber | 8.48 | 8.81 | 8.34 | 8.9 | 8.79 | 8.74 | 8.61 |
| Swell Index | 7.63 | 8.37 | 7.28 | 8.2 | 8.18 | 8.43 | 8.46 |
| Gels | 20.81 | 20.51 | 19.79 | 20.4 | 19.19 | 20.85 | 19.4 |
| Grafting Toluene | 145 | 133 | 137 | 129 | 118 | 139 | 125 |
| M-RPS, $\mu$ | 6.17 | 6.68 | 6.38 | 6.48 | 6.62 | 6.59 | 6.57 |
| Mw | 280750 | 271520 | 278700 | 284960 | 279500 | 274650 | 269600 |
| Mn | 115690 | 106000 | 112600 | 115390 | 120400 | 109380 | 106600 |
| MWD | 2.43 | 2.56 | 2.48 | 2.47 | 2.32 | 2.51 | 2.53 |
| ESCR | 41.1 | 52.2 | 61.7 | 85 | 90.6 | 96.3 | 83 |
| Control Tens, Str @ Max, psi | 3923 | 2651 | 2741 | 3271 | 3111 | 2595 | 2594 |
| ESCR Tens, Str @ Max, psi | 1614 | 1733 | 1690 | 2780 | 2820 | 2499 | 2153 |

Notes:
1) Viscosities - Mineral Oil, 78.7 cst @ 38° C., H100-196-233 cst @ 99° C.
2) The concentrations of these additives in the final product will be higher than the amounts added due to the loss of a considerable portion of styrene (20–35%) during the devolatilization process.

TABLE II

| Property | A Control | B 1.5% MO | C 2.5% MO | D 3% MO | E 1.5% low PIB | F 1.5% H25 Low Med | G 1.5% Med PIB | H 1.5% High PIB |
|---|---|---|---|---|---|---|---|---|
| Tg In ° C. | 108 | 100.2 | 100.9 | n.d | 100.9 | 103.0 | 104.8 | n.d |
| Melt Flow | 0.86 | 1.35 | n.d | 1.66 | 1.2 | n.d | 1.06 | 0.99 |
| % Rubber | 8.5 | 7.8 | 8.3 | 8.5 | 8.1 | 8.8 | 8.6 | 7.2 |
| Swell Index | 7.11 | 9.31 | 7.28 | 9.31 | 8.86 | 7.76 | 8.36 | 10.1 |
| Gels | 22.4 | 19.4 | 19.8 | 20.0 | 19.6 | 19.8 | 20.7 | 18.6 |
| Grafting Toluene | 163 | 150 | 137 | 137 | 142 | 125 | 141 | 158 |
| M-RPS, $\mu$ | 5.54 | 6.37 | 6.38 | 6.22 | 6.02 | 6.64 | 5.88 | 6.42 |
| Mw | 276100 | 278200 | 278700 | 282500 | 275750 | 275000 | 270800 | 278300 |
| Mn | 105500 | 117650 | 112600 | 114000 | 114700 | 107500 | 104300 | 114300 |
| MWD | 2.6 | 2.4 | 2.5 | 2.5 | 2.4 | 2.6 | 2.6 | 2.4 |
| ESCR | 39 | 61 | 62 | 76 | 56 | 69 | 86 | 75 |

| Property | I 3.0% Low PIB | J 2.5% H25 | K 2.5% H100 | L 3.0% MO + ZnSt$_2$ | M 3.0% MO + 500 NDM | N 2.5% H100 + 500 NDM |
|---|---|---|---|---|---|---|
| Tg In ° C. | n.d | 102.4 | 105.0 | n.d | n.d | 101.3 |
| Melt Flow | 1.41 | n.d | n.d | 1.83 | 4.01 | n.d |
| % Rubber | 8.8 | 9.3 | 8.8 | 7.7 | 7.8 | 9.4 |
| Swell Index | 8.53 | 7.3 | 8.18 | 7.85 | 8.57 | 9.2 |
| Gels | 20.5 | 19.7 | 19.2 | 20.6 | 18.8 | 17.1 |
| Grafting | 134 | 113 | 118 | 166 | 132 | 75 |

TABLE II-continued

| | | | | | | |
|---|---|---|---|---|---|---|
| Toluene M-RPS, μ | 6.12 | 6.23 | 6.62 | 5.82 | 5.91 | 6.79 |
| Mw | 274000 | 281550 | 279500 | 272000 | 233000 | 232670 |
| Mn | 112000 | 115160 | 120400 | 112600 | 80500 | 80100 |
| MWD | 2.4 | 2.4 | 2.32 | 2.4 | 2.9 | 2.9 |
| ESCR | 55 | 85 | 91 | 84 | 40 | 95 |

Notes:
1) n.d., - not determined
2) Viscosities - Mineral oil, 78.7 @ 38° C./Low PIB, 27–33 cst @ 38° C./H25, 48–56 cst @ 99° C./H100, 196–233 cst @ 99° C./High PIB, 4069–4380 cst @ 99° C.
3) NDM - n-dodecyl mercaptan
4) ZnSt$_2$ - zinc stearate
5) The concentrations of these additives in the final product will be higher than the amounts added due the loss of a considerable portion of styrene (20–35%) during the devolatilization process In another embodiment of the invention, it was found that ESCR values could be improved up to a certain point solely by adding PIB to the HIPS material, as long as the molecular weight of the PIB being added is controlled within a specific range. Although ESCR values of PIB-only HIPS materials are not as good as those of MO/PIB HIPS materials, they are better than the ESCR values of HIPS without mineral oil or PIB. In low-stress HIPS applications, such PIB-only HIPS materials would provide acceptably good ESCR values, an improvement over conventional HIPS materials.

For example, in Table II, Samples "E"–"K" represent HIPS materials containing different molecular weight PIBs and different levels of PIBs. More specifically, Samples "E"–"H" represent samples of HIPS all having the same percent by weight of PIB but having PIBs of increasing molecular weight (as measured by viscosity). Sample "E" uses a low molecular weight PIB with indicated viscosity of 27–33 cst and results in a HIPS material with ESCR value of 56. Sample "F" uses a low/medium weight PIB with viscosity of 48–56 cst to obtain an ESCR value of 69.

Sample "G" uses a medium molecular weight PIB (viscosity=196–233 cst) in a HIPS material with the result that ESCR is 86. Sample "H" utilizes a high molecular weight PIB (viscosity=4069–4350 cst) and results in a drop-off in ESCR to 75.

Thus, the optimum level of PIB viscosity (molecular weight) for ESCR improvement appears to be between about 196 and 4069.

The same results are apparent in Samples "I"–"K" wherein higher levels of PIB are added to the HIPS materials and the viscosities of the PIB are varied from one sample to the other. The highest ESCR value, 91, is obtained in Sample "K" which utilizes the medium viscosity PIB (196–233 cst @ 99° C.).

Yet another embodiment of the present invention can also be discerned from Samples "L"–"N" of Table II wherein various additives have been tried in the HIPS formulations. Sample "L" utilizes a relatively high level of mineral oil (MO) and a zinc stearate, with a resulting ESCR value of 84, which while not outstanding, is marginally acceptable.

Sample "M" utilizes a combination of mineral oil and n-dodecyl mercaptan (NDM), which serves as a chain transfer agent (CTA). The ESCR value of 40 is unacceptable in HIPS material and primarily results from the presence of the CTA. On the other hand, in Sample "N" a formulation comprising medium viscosity PIB and NDM resulted in a HIPS material having an outstanding ESCR value of 95. (The NDM was added in amounts of 500 PPM of the feed solution.) Although chain transfer agents such as the mercaptan above, as well as t-dodecylmercaptan and alphamethyl styrene dimer, do not improve ESCR, but normally tend to degrade ESCR as shown by sample "M", they do allow the manufacturer to control certain critical properties of the HIPS material, such as polystyrene molecular weight, rubber particle size and melt flow index (i.e., ease of processing characteristics). The use of PIB additives in conjunction with CTAs therefore is an enabling type of system where the use of PIB allows the maker of HIPS to control the above-mentioned characteristics with CTAs, while still maintaining high ESCR values.

When referring to the "gel" level or "gel" content of the HIPS material, it is intended that this term represent the disperse phase contained in the continuous polymerized monovinylaromatic compound phase. The disperse phase, or gel, consists essentially of particles of graft copolymers of the polybutadiene rubber and polymerized monovinylaromatic compound, plus mechanically occluded particles of the polymerized monovinylaromatic compound located in the rubber particles. Gel level may be measured as the toluene-insoluble component of the rubber modified high impact compound. Gel levels are indicated in weight percents.

When referring to monovinylaromatic monomer or compound, it is intended that this include styrenes, alpha-methyl styrene, and ring-substituted styrenes. When referring to rubber, it is intended that such phrase refer to natural rubber, polybutadiene, polyisoprene and copolymers of butadiene and/or isoprene with styrene.

ESCR values are determined according to the procedures set forth in the above incorporated patent, U.S. Pat. No. 4,777,210 at columns 10 and 11 thereof.

Mooney viscosity is determined using the procedures set forth at pages 109 and 110 of *RUBBER TECHNOLOGY*, Third edition, a publication sponsored by the Rubber Division of the American Chemical Society, and published by Van Nostrand Reinhold Company of New York.

What is claimed is:

1. A composition comprising:
   a rubber-modified polymer formed by the polymerization of a monovinylaromatic monomer in the presence of a rubber selected from the group consisting of natural rubbers, polybutadienes, polyisoprenes, and copolymers of butadienes or isoprene with styrene;
   an ESCR enhancing additive comprising polyisobutylene having a viscosity range of 196–233 cst at 99° C., being added to said polymer composition in amounts of from about 1 percent to about 4 percent, by weight of said composition; and
   a chain transfer agent additive.

2. The composition of claim 1 wherein the chain transfer agent is selected from the group consisting of n-dodecyl mercaptan, t-dodecyl mercaptan and alphamethyl styrene dimer.

3. The composition of claim 1 wherein the quantity of chain transfer agent in the compound is in the range of about 10 to about 1000 ppm by weight of rubber-modified polymer.

4. The composition of claim 1 wherein the resulting composition has an ESCR value greater than about 85.

5. The composition of claim 1 wherein the resulting ESCR value of the composition is not decreased by the addition of the chain transfer agent.

6. The composition of claim 1 wherein the average molecular weight of the resulting composition is lowered by the addition of the chain transfer agent without reducing the environmental stress crack resistance of the composition.

7. The composition of claim 1 wherein the rubber is in the range of about 5 to 15 percent by weight.

8. The composition of claim 1 wherein the ESCR enhancing additive is present in the amount of about 0.5 to about 3.0 percent by weight.

9. The composition of claim 1 wherein the monovinylaromatic monomer is selected from the group consisting of styrene, alphamethyl styrene and ring-substituted styrenes.

10. The composition of claim 1 wherein the monovinylaromatic monomer comprises styrene and the additives are added to the composition prior to or during polymerization.

11. Molded thermoplastic food product containers made from the polymeric composition of claim 1.

12. A process for producing a composition, comprising:
polymerizing a mixture of a monovinylaromatic monomer and rubber, the monovinylaromatic monomer being selected from the group consisting of styrene, alphamethyl styrene and ring-substituted styrenes, and the rubber being selected from the group consisting of polybutadiene, polyisoprene, copolymers of butadiene or isoprene with styrene, and natural rubbers; and
adding to the mixture of monomer and rubber, prior to or during the polymerizing process, an ESCR enhancing additive comprising polyisobutylene having a visocity range of 196–233 cst at 99° C., being added to said polymer composition in amounts of from about 1 percent to about 4 percent, by weight of said composition and a chain transfer agent.

13. The process of claim 12 wherein the chain transfer agent is selected from the group consisting of n-dodecyl mercaptan, t-dodecyl mercaptan and alphamethyl styrene dimer.

14. The process of claim 12 wherein the quantity of chain transfer agent in the composition is in the range of about 10 to about 1000 ppm by weight of rubber-modified polymer.

15. The process of claim 12 wherein the resulting composition has an ESCR value greater than about 85.

16. The process of claim 12 wherein the rubber is in the range of about 5 to 15 percent by weight.

17. The process of claim 12 wherein the average molecular weight of the resulting composition is lowered by the addition of the chain transfer agent without reducing the environmental stress crack resistance of the composition.

18. A food service article made from a composition comprising:
a rubber-modified polymer formed by the polymerization of a monovinylaromatic monomer in the presence of a rubber;
an ESCR enhancing additive which is a polyisobutylene having a viscosity range of 196–233 cst at 99° C., being added to said polymer composition in amounts of from about 1 percent to about 4 percent, by weight of said composition; and
a chain transfer agent additive.

19. The food service article of claim 18, wherein the composition has an ESCR value of at least 85.

20. The food service article of claim 18, wherein the monovinylaromatic monomer is selected from the group consisting of styrene, alphamethyl styrene and ring-substituted styrenes; the rubber is selected from the group consisting of natural rubbers, polybutadienes, polyisoprenes, and copolymers of butadienes or isoprene with styrene; the ESCR enhancing additive comprises polyisobutylene; and the chain transfer agent is selected from the group consisting of n-dodecyl mercaptan, t-dodecyl mercaptan and alphamethyl styrene dimer.

21. The food service article of claim 18, wherein the monovinylaromatic monomer comprises styrene, the rubber is in the range of about 5 to 15 percent by weight, the ESCR enhancing additive comprises polyisobutylene which is present in the amount of about 0.5 to about 3.0 percent by weight, the chain transfer agent is in the range of about 10 to about 1000 ppm, and the resulting composition has an ESCR value greater than 85.

22. The food service article of claim 18, wherein the article comprises a refrigerator liner.

23. The food service article of claim 18, wherein the article comprises a molded thermoplastic food product container.

24. A composition comprising:
a rubber-modified polymer formed by the polymerization of a monovinylaromatic monomer in the presence of a rubber selected from the group consisting of natural rubbers, polybutadienes, polyisoprenes, and copolymers of butadienes or isoprene with styrene;
blended with mineral oil and polyisobutylene having a viscosity range of 196–233 cst at 99° C. in the range of from about 0.5 up to about 3.0 percent each, by weight of finished composition.

25. The composition of claim 24 wherein the resulting composition has an ESCR value greater than about 80.

26. The composition of claim 24 wherein the monovinylaromatic monomer is selected from the group consisting of styrene, alphamethyl styrene and ring-substituted styrenes.

27. The composition of claim 24 wherein the mineral oil and polyisobutylene are added prior to or during polymerization.

28. A process for producing a composition, comprising:
polymerizing a mixture of a monovinylaromatic monomer and rubber, the monovinylaromatic monomer being selected from the group consisting of styrene, alphamethyl styrene and ring-substituted styrenes, and the rubber being selected from the group consisting of polybutadiene, polyisoprene, copolymers of butadiene or isoprene with styrene, and natural rubbers; and
adding to the mixture of monomer and rubber, prior to or during the polymerizing process, mineral oil and polyisobutylene having a viscosity range of 196–233 cst at 99° C. in the range of from about 0.5 up to about 3.0 percent each, by weight of finished composition.

29. The process of claim 28 wherein the resulting composition has an ESCR value greater than about 80.

30. The process of claim 28 further comprising the addition of a chain transfer agent selected from the group consisting of n-dodecyl mercaptan, t-dodecyl mercaptan and alphamethyl styrene dimer.

31. The process of claim 28 wherein the chain transfer agent is n-dodecyl mercaptan in the range of about 10 to about 1000 ppm by weight of rubber-modified polymer.

32. A food service article made from a composition comprising:

a rubber-modified polymer formed by the polymerization of a monovinylaromatic monomer in the presence of a rubber;

blended with mineral oil and polyisobutylene having a viscosity range of 196–233 cst at 99° C. in the range of from about 0.5 up to about 3.0 percent each, by weight of finished composition.

33. The article of claim 32, wherein the composition has an ESCR value of at least 80.

34. The article of claim 32, wherein the monovinylaromatic monomer is selected from the group consisting of styrene, alphamethyl styrene and ring-substituted styrenes; and the rubber is selected from the group consisting of natural rubbers, polybutadienes, polyisoprenes, and copolymers of butadienes or isoprene with styrene.

35. The article of claim 32 wherein the composition further comprises the addition of a chain transfer agent selected from the group consisting of n-dodecyl mercaptan, t-dodecyl mercaptan and alphamethyl styrene dimer.

36. The article of claim 35 wherein the chain transfer agent is n-dodecyl mercaptan in the range of about 10 to about 1000 ppm by weight of rubber-modified polymer.

37. The food service article of claim 32, wherein the article comprises a refrigerator liner.

38. The food service article of claim 32, wherein the article comprises a molded thermoplastic food product container.

* * * * *